United States Patent Office 3,551,481
Patented Dec. 29, 1970

3,551,481
PROCESS FOR THE PRODUCTION OF TRIMELLITIC ACID AND TRIMELLITIC ACID ANHYDRIDE
Hans-Leo Hülsmann, Wengern, Gerhart Hoffmann, Witten-Rudinghausen, and Gustav Renckhoff and Albino Pastura, Witten (Ruhr), Germany, assignors to Dynamit Nobel Aktiengesellschaft, Troisdorf, Germany
No Drawing. Filed Oct. 20, 1967, Ser. No. 676,720
Claims priority, application Germany, Oct. 20, 1966, 51,368
Int. Cl. C07c 63/02
U.S. Cl. 260—524　　　　　　　　　　　　13 Claims

ABSTRACT OF THE DISCLOSURE

A process for the production of trimellitic acid, using the residues obtained in the liquid phase during the production of dimethyl terephthalate by the oxidation of p-xylene by way of p-toluic acid methyl ester, which comprises distilling said residues in vacuo, withdrawing therefrom a distillate fraction enriched in trimellitic acid methyl esters, saponifying said fraction, and separating trimellitic acid from resultant hydrolysate.

BACKGROUND OF THE INVENTION

Recently, trimellitic acid and trimellitic acid anhydride have gained great technical importance as a starting material for the manufacture of polyesters, polyester imides and plasticizers. Various processes have been suggested for the production of trimellitic acid. These include the multi-stage air oxidation of pseudocumene (British Pat. 727,989), the oxidation of pseudocumene by means of nitric acid under pressure (U.S. Pat. 3,086,992), a combination of the two above-mentioned processes (British Pat. 907,926), and the oxidation of pseudocumene in a strongly corrosive medium of acetic acid, bromides and heavy metal salts, by the effect of oxygen under pressure (US. Pat. 2,833,816).

The conventional processes are difficult to conduct on a technical or industrial scale. Consequently, at present, only completely insufficient amounts of trimellitic acid and trimellitic acid anhydride are produced. It is known that the conversion of the acid into its anhydride can be conducted in accordance with conventional methods, for example, by heating the acid under vacuum.

Accordingly, one of the objects of the present invention is to provide a process for the production of trimellitic acid and/or trimellitic acid anhydride which overcomes the deficiencies of the prior art methods.

Another object of the present invention is to provide a process for producing trimellitic acid and trimellitic acid anhydride which may be carried out in an efficacious manner.

A further object of the invention is to provide a process for the production of trimellitic acid and/or trimellitic acid anhydride which may be carried out advantageously on an industrial scale economically to give a good yield of product.

A still further object of the invention is to provide trimellitic acid and trimellitic acid anhydride.

These and other objects and advantages of the present invention will become apparent to those skilled in the art from a consideration of the following specification and claims.

SUMMARY OF THE INVENTION

In accordance with the present invention, it has been surprisingly discovered that the trimethyl ester of trimellitic acid is obtained as a by-product during the production of the dimethyl ester of terephthalic acid by the air oxidation of p-xylene, for example, according to the process of U.S. Pat. 2,894,978. This is true even though the p-xylene employed in this process is practically free of trimethylbenzenes. Apparently, the trimellitic acid is formed from trifunctional compounds during the course of the oxidation process, these compounds occurring as intermediaries in the intermolecular condensation of reactive intermediate products.

Accordingly, the present invention relates to a process wherein trimellitic acid or the anhydride thereof can be obtained from the by-products of the production of dimethyl terephthalate in accordance with the above-mentioned processes.

In the production of the dimethyl ester of terephthalic acid by the air oxidation of p-xylene, the acids formed during the oxidation are first esterified with methanol. The resulting mixture of methyl esters, mainly methyl p-toluate and dimethyl terephthalate, as well as higher-boiling compounds, is separated during the course of the process by distillation, by recrystallization or also by conducting both process steps in sequence, into dimethyl terephthalate, intermediates of the oxidation and by-products. In this connection, the trimellitic acid ester enters either the distillation residue or the mother liquor of the recrystallization step.

It has been discovered in accordance with the present invention that it is possible to obtain trimellitic acid and/or trimellitic acid anhydride from residues of the dimethyl terephthalate production by air oxidation of p-xylene by way of the methyl ester of p-toluic acid, in the liquid phase, in a manner affording great economies, by distilling these residues under a vacuum, withdrawing a fraction of the distillate enriched in trimellitic acid esters, saponifying the same, separating trimellitic acid from the acidic hydrolysate and, if desired, forming the anhydride of this acid in a conventional manner.

The starting material for the process of this invention can be distillable higher-boiling components of the distillate residue obtained during the production of dimethyl terephthalate, the residue being withdrawn at a suitable place in the process. Further suitable starting materials are the filtrate residues obtained during the working up of the crude products by recrystallization. Previously, these have been burned up as worthless waste products. During the fractional distillation of the respective residue, it is possible, for example, to withdraw a fraction boiling within the boiling point limits of 190–230° C. at 10 torr (mm. Hg). In general, the distillation can be conducted under conditions under which the trimellitic acid trimethyl ester can be distilled without being decomposed. Preferably, for processing according to the method of this invention, distillate fractions are employed which are enriched to above 50% by weight in trimellitic acid trimethyl ester.

The saponification of the distillate fractions enriched in trimellitic acid trimethyl ester can be carried out in the acidic, as well as in the alkaline phase. In the acidic saponification of the trimellitic acid trimethyl ester-enriched distillate fractions by heating with aqueous mineral acid solutions, preferably with the methanol being distilled off, there is obtained, after termination of the hydroylsis, a suspension of acids having a low solubility under heat in a mineral-acidic solution of trimellitic acid. After forming the anhydride, it is possible to distill off trimellitic acid anhydride directly from the acid mixture separated during the cooling of the solution. Or, pure trimellitic acid can be obtained by crystallization from the filtrate after the acids which are only poorly soluble in heat have been separated. It is advantageous to first remove the poorly soluble concomitantly obtained substances after moderate cooling of the solution, preferably to 60° C., since in this case there crystallizes a particularly pure trimellitic acid, upon further cooling, from the aqueous solution.

The alkaline saponification of the trimellitic acid trimethyl ester-enriched distillate fractions is conducted by heating with aqueous solutions of strong bases. Particularly suitable as the saponifying agents are potassium or sodium hydroxide. The concentration of the alkaline substance is variable within wide limits. Preferably, a concentration is selected such that a final solution is obtained which is opaque to clear under heat and from which solution salts do not yet precipitate at the boiling temperature of the solution. This is the case, for example, when employing an 8–15% alkaline solution. The use of a more dilute alkaline solution is not recommended, since in such batches a very bothersome foaming occurs during the hydrolysis steps. This inconvenience is avoided by maintaining the above-mentioned concentration of alkaline solution. After the hydrolysate has been acidified by adding an at least equivalent amount of a mineral acid, preferably nitric acid, at temperatures close to the boiling point of the salt solution, the acids which have a low solubility under heat and the unsaponifiable substances are separated, after moderate cooling of the solution, particularly to about 60° C. Upon cooling of the acidic, hot filtrate, trimellitic acid crystallizes.

The trimellitic acid, present as a crystallizate after the acidic as well as the alkaline processing in the mineral acid solution, is either obtained as such, after washing with cold water and drying, or the anhydride is formed therefrom subsequently in a conventional manner, for example, by heating under a vacuum.

EXAMPLES OF THE INVENTION

The following examples are given merely as illustrative of the present invention and are not to be considered as limiting. Unless otherwise noted, the percentages therein and throughout the application are by weight.

Example I

The filtrate residue (8,000 parts by weight) obtained from the recrystallization of crude dimethyl terephthalate produced in accordance with U.S. patent 2,894,978 is fractionally distilled in a batch-wise operating distillation apparatus. This apparatus consists of a still having a capacity of 10,000 parts by volume and a column with 16 bubble trays. The filtrate residue is obtained by first mixing 1.2 kg. of 96% p-xylene and 3.6 kg. of pure methyl ester of p-toluic acid into a pressure-resistant oxidation vessel of 10 liters capacity which is provided with a reflux cooler and a water separator. The cobalt salt of the first runnings obtained on distillation of coconut oil fatty acids in the amount of 10 g. are added to the above mixture as a catalyst. Air is introduced into the mixture at temperature of 160° C. and a pressure of 5 atomspheres. Air, measured at atmospheric pressure, is introduced into the vessel at a rate of 1.08 cu. m. per hour. The acid number of the oxidation mixture, after 20 hours total oxidation time, is about 250 and 5.2 kg. of oxidation mixture is obtained. The mixture is esterified by heating with about 20 liters of methanol in the presence of 180 g. of 98% sulfuric acid at 65° C. for 30 hours. After cooling, the crystallized dimethyl ester of terephthalic acid is filtered off, and the resulting filtrate is then fractionally distilled. The fractional distillation is carried out at 20 torr with a reflux ratio of 1:1. In this process, there is obtained 2,200 parts by weight of a fraction boiling between 200° and 220° C. This fraction contains a proportion of 65% by weight of trimellitic acid trimethyl ester.

Into 1,104 parts by weight of 30% sulfuric acid, heated with stirring to the boiling point, there is added dropwise 500 parts by weight of the above-mentioned distillate fraction. Within 6 hours, 268 parts by weight of a methanol-water mixture is distilled off. Omitting the separation of those components having a poor solubility under heat, the reaction mixture is cooled to 20° C. The precipitated acids are vacuum-filtered and washed with 50 parts by weight of cold water. Obtained is 605 parts by weight of moist acid. A dried sample of these acids exhibits an acid number of 772 (calculated, 800).

In order to form the anhydride thereof, 585 parts by weight of the moist acid is employed. After driving off the water adhering thereto, the conversion to the anhydride takes place at 160–210° C. and at a pressure of 15 torr. During the subsequent vacuum distillation, 200 parts by weight of trimellitic acid anhydride passes over at 256–260° C. and 20 torr. The acid number thereof is 867 (calculated, 876). The amount of sulfur found to be present is 0.08%. The resultant anhydride melts at 160–163° C. (literature, 162.5–163.5° C.).

Example II

A trimellitic acid trimethyl ester concentrate (300 parts by weight) produced according to Example I is heated to the boiling point with 1500 parts by volume of 30% sulfuric acid for six hours, with the methanol split off being distilled therefrom. The saponification results in 206 parts by weight of acids, which is recrystallized twice from water. There is obtained 159 parts by weight of pure trimellitic acid, having a melting point of 223–226° C. (literature, 221° C.), an acid number of 788 and a saponification number of 790 (caluculated, 800).

Example III

The distillation residue from the fractional distillation of crude methyl ester mixtures (8,000 parts by weight), as obtained during the preparation of dimethyl terephthalate according to U.S. pat. 2,894,978, is distilled in a distillation apparatus operated in a batch-wise manner, similar to the procedure as described in Example I. In this process, there is obtained 830 parts by weight of a fraction consisting of 52% by weight of trimellitic acid ester. A distillate fraction of a dimethyl terephthalate filtrate residue, enriched in trimellitic acid trimethyl ester, is obtained at a boiling temperature of 207–208° C. at 15 torr. It consists, according to analysis by gas chromatography, of about 60% by weight of trimellitic acid trimethyl ester. The fraction has an acid number of 17 and a saponification number of 631.

This distillate fraction (1,000 parts by weight) is saponified by heating, with agitation, with a solution of 450 parts by weight of sodium hydroxide in 4,750 parts by weight of water. The saponification reaction is carried out for four hours. During this time, 750 parts by weight of a methanol-water mixture is distilled off. At 95° C., 1,847 parts by weight of 50% nitric acid is added in batches. A white, easily stirable suspension is formed, which is cooled to 60° C. Upon vacuum filtering at this temperature, 70 parts by weight of solids is obtained. The filtrate is subsequently cooled to 15° C. During this procedure, trimellitic acid crystallizes, which is vacuum-filtered, washed with water and dried. The yield of dry acid is 657.5 parts by weight. The acid number thereof is 783 (calculated, 800).

By heating to 160–210° C. at 15 torr, the acid is converted into the anhydride thereof. During the distillative working-up process, 453 parts by weight of trimellitic acid anhydride is obtained at 250–253° C. and 17 torr. The melting point of the distilled anhydride is 160–163° C. The saponification number thereof is 865 (calculated, 876).

The invention being thus described, it will be obvious that the same may be varied in many ways. Such varations are not to be regarded as a departure from the spirit and scope of the invention and all such modifications are intended to be included within the scope of the following claims.

We claim:

1. A process for the production of trimellitic acid which comprises:
   distilling under a vacuum the residues obtained in the liquid phase during the production of dimethyl terephthalate from a mixture of p-xylene and the methyl ester of p-toluic acid the production of said ester comprising the steps of oxidizing a mixture of p-xylene and the methyl ester of p-toluic acid in the proportion by weight between about 1:3 and, at the most, 1:1 in the liquid phase with an oxygen-containing gas at a temperature between about 80° C. and about 250° C. in the presence of an oxidation catalyst for a prolonged period of time until the p-xylene is substantially completely oxidized and continuing oxidation of the resulting intermediate, substantially p-xylene-free oxidation mixture until as much p-toluic acid ester is oxidized as corresponds to the amounts of p-toluic acid formed on p-xylene oxidation, said residues being either the distillable higher-boiling components of the distillate residue obtained during the distillation of the dimethyl terephthalate, oxidation intermediates, and by products or the mother liquor in the recrystallization of the dimethyl terephthalate;

withdrawing from said residues a distillate fraction enriched in trimellitic acid methyl esters;

saponifying said fraction; and separating trimellitic acid from the resulting hydrolysate.

2. The process of claim 1, wherein the starting residues are obtained during the production of dimethyl terephthalate by the air oxidation of p-xylene.

3. The process of claim 1, wherein the saponification is conducted by heating said fraction with an aqueous solution of a mineral acid.

4. The process of claim 1, wherein the saponification is conducted by heating said fraction with an aqueous solution of a strong base.

5. The process of claim 4, wherein said strong base is selected from the group consisting of potassium hydroxide and sodium hydroxide.

6. The process of claim 4, wherein the resultant aqueous hydrolysate, after termination of the saponification, is acidified by adding thereto a mineral acid at temperatures close to the boiling point of the solution.

7. The process of claim 6, wherein said mineral acid is nitric acid.

8. The process of claim 3, wherein the unsaponifiable components and the concomitant acids having a low solubility under heat are separated at temperatures below the boiling point of the solution and are removed by filtration or centrifuging from the solution.

9. The process of claim 8, wherein the separation is effected at about 60° C.

10. The process of claim 6, wherein the unsaponifiable components and the concomitant acids having a low solubility under heat are separated, after the hydrolysate has been acidified, at temperatures below the boiling point of the solution and are removed by filtration or centrifuging from the solution.

11. The process of claim 10, wherein the separation is effected at about 60° C.

12. A process for the production of trimellitic acid which comprises distilling under a vacuum the residues obtained in the liquid phase during the production of dimethyl terephthalate by the air oxidation of a mixture of p-xylene and p-toluic acid methyl ester in the proportion by weight between about 1:3 and, at the most, 1:1 in the liquid phase with an oxygen-containing gas at a temperature between about 80° C. and about 250° C. in the presence of an oxidation catalyst for a prolonged period of time until the p-xylene is substantially completely oxidized and continuing oxidation of the resulting intermediate, substantially xylene-free oxidation mixture until as much p-toluic acid methyl ester is oxidized as corresponds to the amounts of toluic acids formed on xylene oxidation, said residues being either the distillable higher-boiling components of the distillate residue obtained during the distillation of dimethyl terephthalate, oxidation intermediates and by-products or the mother liquor in the recrystallization of dimethyl terephthalate;

withdrawing from said residue a distillate fraction boiling between approximately 190° C. and 230° C. at 10 torr, said fraction being enriched in trimellitic acid methyl esters in an amount greater than 50% by weight;

saponifying said fraction; and separating trimellitic acid from the resultant acidic hydrolysate.

13. A process for the production of trimellitic acid which comprises:

distilling under a vacuum the residues obtained in the liquid phase during the production of dimethyl terephthalate, said dimethyl terephthalate being produced by oxidizing a mixture of p-xylene and the methyl ester of p-toluic acid in the proportion by weight between about 1:3 and, at the most, 1:1, at a temperature between about 140° C. and 1.5 atm. gauge and about 5 atm. gauge with the addition of the colbaltous salt of the fatty acids obtained as first runnings in the distillation of coconut oil fatty acids for a prolonged period of time until the xylene is substantially completely oxidized, continuing oxidation of the resulting oxidation mixture until an amount of the methyl ester of p-toluic acid corresponding to the amount of p-toluic acid formed on oxidation of p-xylene is oxidized, esterifying the reaction mixture by heating the methanol in the presence of an esterification catalyst, cooling the esterification mixture, removing, by filtration, the crystallized dimethyl ester of terephthalic acid;

withdrawing from said residues a distillate fraction boiling between about 190° and 230° C. at 10 torr, said fraction being enriched in trimellitic acid methyl esters in an amount greater than 50% by weight;

saponifying said fraction; and separating trimellitic acid from the resulting acidic hydrolysate.

References Cited
UNITED STATES PATENTS

| | | | |
|---|---|---|---|
| 2,894,978 | 7/1959 | Katzschmann | 260—524 |
| 2,958,701 | 11/1960 | McKinnis | 260—346.7 |
| 2,998,431 | 8/1961 | McKinnis | 260—346.7 |

LORRAINE A. WEINBERGER, Primary Examiner

R. S. WEISSBERG, Assistant Examiner

U.S. Cl. X.R

260—475